US008522915B2

(12) United States Patent
Hopperstad et al.

(10) Patent No.: US 8,522,915 B2
(45) Date of Patent: Sep. 3, 2013

(54) METHOD AND SYSTEM FOR SELECTING PARAMETERS OF A SEISMIC SOURCE ARRAY

(75) Inventors: Jon-Fredrik Hopperstad, Cambridge (GB); Robert Montgomery Laws, Cambridge (GB); Julian Edward Kragh, Finchingfield (GB)

(73) Assignee: WesternGeco L.L.C., Houston, TX (US)

( * ) Notice: Subject to any disclaimer, the term of this patent is extended or adjusted under 35 U.S.C. 154(b) by 0 days.

(21) Appl. No.: 12/809,091

(22) PCT Filed: Dec. 12, 2008

(86) PCT No.: PCT/GB2008/004182
§ 371 (c)(1),
(2), (4) Date: Oct. 14, 2010

(87) PCT Pub. No.: WO2009/077762
PCT Pub. Date: Jun. 25, 2009

(65) Prior Publication Data
US 2011/0017543 A1    Jan. 27, 2011

Related U.S. Application Data

(60) Provisional application No. 61/015,115, filed on Dec. 19, 2008.

(51) Int. Cl.
*G01V 1/00* (2006.01)
*G01V 1/02* (2006.01)
*G01V 1/04* (2006.01)
*G01V 1/06* (2006.01)
*G01V 1/38* (2006.01)
*G01V 1/137* (2006.01)

(52) U.S. Cl.
USPC ........... 181/113; 181/111; 181/118; 181/120; 367/15; 367/21; 367/23; 367/73; 367/144

(58) Field of Classification Search
USPC .................. 181/113, 111, 118, 120; 367/23, 367/73, 15, 21
See application file for complete search history.

(56) References Cited

U.S. PATENT DOCUMENTS 4,254,480 A * 3/1981 French ........................... 367/58
4,752,916 A * 6/1988 Loewenthal ................... 367/24
(Continued)

FOREIGN PATENT DOCUMENTS
GB    2376528 A    12/2002
WO    9848301 A1    10/1998

OTHER PUBLICATIONS

Dragoset, "Air-gun array specs: A tutorial," Geophysics: The Leading Edge of Exploration, Jan. 1990: pp. 24-32.
(Continued)

*Primary Examiner* — David Warren
*Assistant Examiner* — Christina Russell

(57) ABSTRACT

A method for selecting parameters of a seismic source array comprising a plurality of source elements each having a notional source spectrum is described, the method comprising calculating a ghost response function of the array; calculating directivity effects of the array; and adjusting the parameters of the array such that the directivity effects of the array are compensated by the ghost response to minimize angular variation of a far field response in a predetermined frequency range. A method for determining a phase center of a seismic source array is also related, the method comprising calculating a far field spectrum of the array at predetermined spherical angles, and minimizing the phase difference between the farfield spectra within a predetermined frequency range by adjusting a vertical reference position from which the spherical angles are defined.

17 Claims, 11 Drawing Sheets

(56) References Cited

U.S. PATENT DOCUMENTS

| | | | |
|---|---|---|---|
| 4,760,563 A * | 7/1988 | Beylkin | 367/73 |
| 4,956,822 A * | 9/1990 | Barber et al. | 367/23 |
| 5,148,406 A * | 9/1992 | Brink et al. | 367/22 |
| 5,173,880 A * | 12/1992 | Duren et al. | 367/73 |
| 5,184,329 A * | 2/1993 | Regnault et al. | 367/23 |
| 5,281,773 A * | 1/1994 | Duren | 181/111 |
| 5,991,238 A * | 11/1999 | Barr | 367/62 |
| 5,995,452 A * | 11/1999 | Bouyoucus | 367/153 |
| 7,257,049 B1 * | 8/2007 | Laws et al. | 367/23 |
| 7,466,626 B2 * | 12/2008 | Baaren | 367/54 |
| 7,466,632 B1 * | 12/2008 | Sorli | 367/153 |
| 7,782,708 B2 * | 8/2010 | Christie et al. | 367/21 |
| 7,948,825 B2 * | 5/2011 | Moldoveanu | 367/15 |
| 8,014,228 B2 * | 9/2011 | Schreurs et al. | 367/16 |
| 8,102,731 B2 * | 1/2012 | Cambois | 367/15 |
| 8,205,711 B2 * | 6/2012 | Hopperstad et al. | 181/111 |
| 2003/0168277 A1 * | 9/2003 | Hopperstad et al. | 181/111 |
| 2004/0136266 A1 * | 7/2004 | Howlid et al. | 367/21 |
| 2011/0299360 A1 * | 12/2011 | Lansley et al. | 367/20 |

OTHER PUBLICATIONS

Hopperstad et al., "An azimuth-invariant source array," SEG International Exposition and Annual Meeting, San Antonio, Texas, Sep. 2001: pp. 1-4.

Saunders et al., "H018 an efficient, compact omni-directional air gun array for the Valhall 4D/4C seismic survey," EAGE 66th Conference and Exhibition, Paris, France, Jun. 2004: pp. 1-5.

Hopperstad et al., "B025 Fundamental principles of isotropic marine source design," 70th EAGE Conference and Exhibition, Rome, Italy, Jun. 2008: pp. 1-5.

International Search Report of PCT Application No. PCT/GB2008/004182 dated Oct. 1, 2009.

* cited by examiner

_METHOD AND SYSTEM FOR SELECTING PARAMETERS OF A SEISMIC SOURCE ARRAY_

FIELD

The present invention relates to a method and system for selecting parameters of a seismic source array, more particularly, selecting physical parameters that will minimize angular variation of the far field spectrum. The invention also relates to a method and system for determining the phase centre of a seismic source array that minimizes the angular phase variation of the array.

BACKGROUND

Seismic sources usually comprise arrays of individual seismic source elements. The most common marine seismic source elements are airguns, but other elements such as vibrators, waterguns and sparkers etc. may also be used. The seismic source elements behave individually as point sources over the bandwidth of interest and are each characterized by a notional source signature, sometimes called the monopole source function.

Seismic source arrays exhibit directivity. This directivity may produce directivity patterns that are determined by the notional source signatures, the positions, and the activation times of the source elements in the array. The reflected signal from the sea surface may strongly affect the directivity pattern For some conditions, it is desirable that the source array should behave as closely as possible to a monopole source. Today's commercially available sources try to achieve this by reducing the array size such that the maximum array dimension is considerable smaller than the shortest wavelength of interest. However, this will not result in a monopole source spectrum when the sea surface reflection is taken into account. The resulting source will be a dipole. Embodiments of the present invention may provide a method for designing an improved monopole source configuration.

SUMMARY

The present invention provides a method for selecting parameters of a seismic source array comprising a plurality of source elements each having a notional source spectrum, the method comprising:
 calculating a ghost response function of the array;
 calculating directivity effects of the array; and
 adjusting the parameters of the array such that the directivity effects of the array are compensated by the ghost response to minimize angular variation of a far field response in a predetermined frequency range.

Preferably, the depths of the source elements are selected such that a first notch in the ghost response is above the predetermined frequency band.

In one embodiment, the array comprises a single layer of source elements at a common depth, and the parameters comprise the length to depth ratio of the source array. Preferably, the length to depth ratio is 1.5 to 3.

In another embodiment, the array comprises a plurality of layers, each layer comprising a plurality of source elements having substantially the same depth. Preferably, the minimum wavelength of the predetermined frequency band is greater than 4/3 of the maximum source element depth, i.e. $d_{max}/\lambda<0.75$, more preferably the minimum wavelength of the predetermined frequency band is greater than two times the maximum source element depth, i.e. $d_{max}/\lambda<0.5$ Preferably, the depth ratio of the layers is adjusted such that a first notch in the ghost response is above the predetermined frequency band. Preferably, the array comprises two layers of source elements and the depth ratio of the two layers is in the range 0.25 to 0.6, more preferably 0.3 to 0.5. Preferably, the notional source spectra of the elements at each depth layer are substantially identical. Preferably, the length to depth ratio of each layer is less than 2.

In another embodiment, the element positions substantially form a vertical line array.

In a preferred embodiment, the positions of the source elements have rotational symmetry in azimuth of order three or greater in the horizontal plane.

Preferably, the angular variation is minimized within the range of take-off angles of 0 to 40 degrees.

Preferably, the predetermined frequency range is 0 to 150 Hz.

Preferably, the method further comprises:
 calculating a far field spectrum of the array having the selected parameters; and
 determining the phase center of the array that minimizes angular phase variation of the far field spectrum in a predetermined frequency range.

The present invention also provides a method for determining a phase center of a seismic source array, the method comprising:
calculating a far field spectrum of the array at predetermined spherical angles, and minimizing the phase difference between the farfield spectra within a predetermined frequency range by adjusting a vertical reference position from which the spherical angles are defined.

Preferably, calculating the far field spectrum comprises calculating the aperture response function, calculating the ghost response function and calculating the far field spectrum based on a combination of the aperture response function and the ghost response function. Preferably, the angular phase variation is minimized within the range of take-off angles of 0 to 40 degrees. Preferably, the predetermined frequency range is 0 to 150 Hz.

Preferably, the array comprises a plurality of layers, each layer comprising a plurality of source elements having substantially the same depth, and wherein the elements in each layer are configured to fire with a synchronization time delay to align the vertically downgoing wavefields. Preferably, the array comprises two layers of source elements and the depth ratio of the two layers is in the range 0.25 to 0.6, more preferably in the range 0.3 to 0.5.

BRIEF DESCRIPTION OF THE DRAWINGS

Embodiments of the present invention will now be described with reference to the accompanying figures, in which.

DETAILED DESCRIPTION

Figure 1:
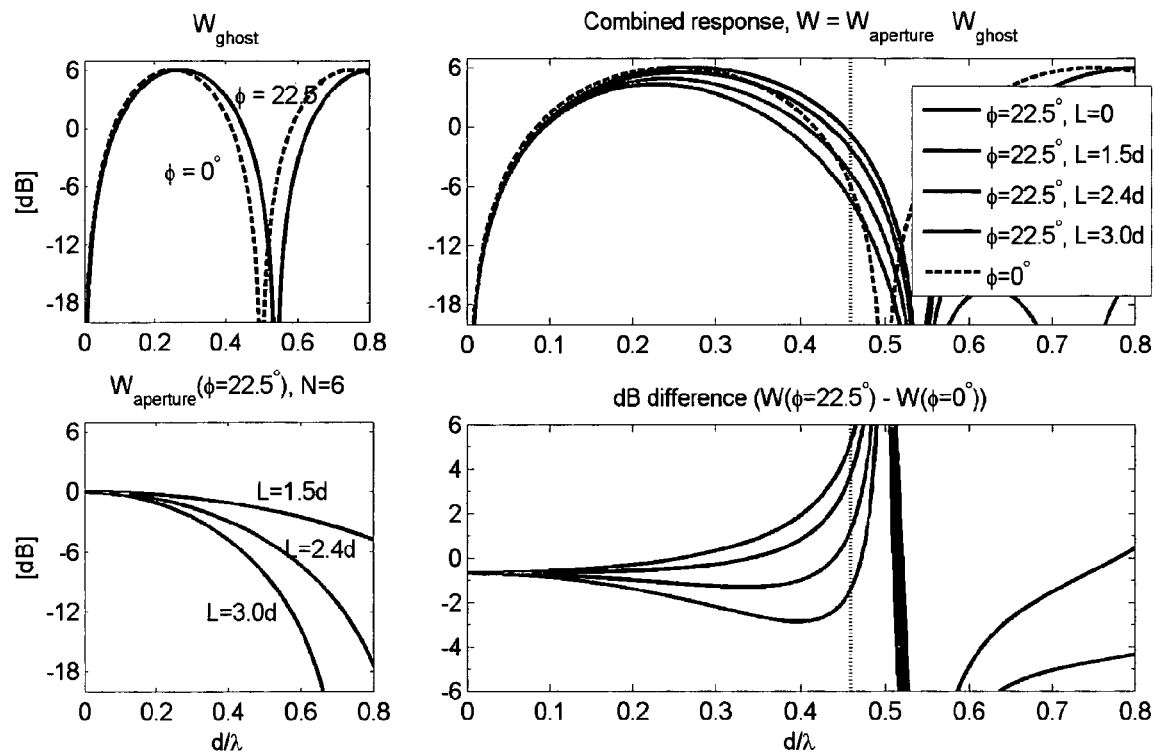
FIG. 1 illustrates a ghost response of a single depth source, an aperture smoothing function of a 6 element array, combined spectrum for the 6 element array and spectral difference between the combined response at 22.5 degree and 0 degree take-off angles for a 6 element linear array.

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments maybe practiced without these specific details.

As earlier noted, it is desirable that the source array should behave as closely as possible to a monopole source. Today's commercially available sources try to achieve this by reducing the array size such that the maximum array dimension is considerable smaller than the shortest wavelength of interest. However, this will not result in a monopole source spectrum when the sea surface reflection is taken into account. The resulting source will be a dipole. Herein we describe how to design a marine source array that is the optimum approximation to a monopole source. This is achieved by analysing the relative contribution of the three main components of the farfield source spectrum: the ghost response, the aperture smoothing function, and the monopole spectra of the individual source elements. In particular, we observe that only the ghost response and the aperture smoothing function is angular dependent, and furthermore, that the power spectral variation with take-off angle (to the vertical) is opposite for the aperture function and the ghost response for part of the frequency band, e.g. the aperture function attenuates non-vertical signals, while the ghost response amplifies signals propagating at non-vertical angles relative to the vertical output.

The general case is presented first. The farfield spectrum of general multi-depth source array geometries may be given by $$W = \sum_{n=1}^{N} \begin{bmatrix} S_n(\omega) \cdot \exp(jk_x x_n + jk_y y_n) \cdot [\exp(jk_z z_n) + \rho \exp(-jk_z z_n)] \\ \cdot \exp(-j\omega\tau_n) \cdot \exp(-jk_z z_{ref}) \end{bmatrix} \quad (1)$$

Where $S(\omega)$ is the monopole response, $x_n, y_n, z_n$ are the coordinates of the N source elements, $k_x, k_y, k_z$ the respective spatial wavenumbers, $\rho$ the sea-surface reflection coefficient, $\omega$ the angular frequency, and $\tau_n$ the synchronization delays, e.g. setting $\tau_n = (z_n - z_{min})/c$ aligns the vertically down-going wavefield, where c is the acoustic velocity. Furthermore, the last factor shifts the reference point from the origin at the sea surface to a chosen vertical reference position $z_{ref}$. The choice of $z_{ref}$ is important for locating the acoustic centre of the array, which will be discussed in detail later.

Note, equation 1 comprises three main factors: the notional source spectrum, $S(\omega)$, the two-dimensional discrete aperture smoothing function, $W(k_x, k_y)$, and the ghost response, $W(k_z)$. The two latter factors may be given by $$W_{aperture}(k_x, k_y) = \exp(jk_x x_n + jk_y y_n)$$

$$W_{ghost}(k_z) = \exp(jk_z z_n) + \rho \exp(-jk_z z_n) \quad (2)$$

In an embodiment of the present invention, by analyzing the relative contribution of these three factors, improved dimensions may be determined for designing isotropic source configurations, i.e. source arrays with minimum variation in azimuth- and take-off angle for a specified frequency band.

Examples of such analyses will be given herein. These examples demonstrate that the current practices do not result in the best isotropic sources. To minimize the source array directivity, today's commercially available sources aim to approximate a point aperture (zero lateral extent), or at least reduce the array size such that the maximum array dimension is considerable smaller than the shortest wavelength of interest. However, this does not result in optimum isotropic source configurations when the sea surface reflection is taken into account.

Single Depth Linear Arrays

First, a point aperture is investigated. The farfield spectrum of a single element at depth d at take-off angle $\phi$ is given by $$W(\omega, \phi) = S(\omega) \cdot \left[ \exp\left(\frac{j\omega d}{c} \cos\phi\right) - \exp\left(-\frac{j\omega d}{c} \cos\phi\right) \right] \quad (3)$$

$$= j2S(\omega) \cdot \sin\left(\frac{\omega d}{c} \cos\phi\right)$$

when the sea-surface reflection coefficient is −1. In this case the farfield spectrum is simply the product of the notional source spectrum, $S(\omega)$, and the ghost response. Note, the farfield spectrum of a point aperture is not isotropic when the sea-surface reflection is included. It is well-known that its spectrum will have notches at (linear) frequencies that are multiples of $f = c/(2 d \cos\phi)$.

The spectral variation with take-off angle for a single element may be known in the prior art, but the prior art does not teach the relation to the optimum discrete aperture smoothing function.

The spectral variation with take-off angle may be minimized by placing the N elements at positions such that the associated discrete aperture smoothing function partially offsets the angular variation of the ghost response. In the next example, this is demonstrated for a linear array with N elements, symmetric about x=0, for which the farfield spectrum is given by $$W(\omega, \phi) = j2\sin\left(\frac{\omega d}{c}\cos\phi\right) \cdot \sum_{n=1}^{N} S_n(\omega) \cdot \exp\left(\frac{j\omega x_n}{c}\sin\phi\right) \quad (4)$$

$$= j2\sin\left(\frac{\omega d}{c}\cos\phi\right) \cdot \sum_{n=1}^{N/2} 2S_n(\omega) \cdot \cos\left(\frac{j\omega|x_n|}{c}\sin\phi\right)$$

In a special case of equation 4 where the notional sources, $S_n(\omega)$, are identical, the farfield spectrum of the linear single depth array is the product of the ghost response, the discrete aperture smoothing function, and the notional source spectrum. Note, since the notional source spectrum is not a function of the take-off angle, the notional source spectrum is a spectral weighting function for the combined response of the other two factors. Consequently, in certain aspects, for arrays with substantially identical notional source elements, one may derive the optimum isotropic source array configuration by analysing the combined response of the ghost response and the aperture smoothing function.

FIG. 1 shows an example of this for a linear array with six equidistant elements deployed at the same depth. The top left panel shows the ghost response of a single depth source at $\phi=0°$ (dash) and $\phi=22.5°$ (solid) take-off angles. Note that at the upper half of the frequency band ($0.25<d/\lambda<0.5$) the ghost response amplify signals propagating at non-vertical angles relative to the output at vertical, i.e. the solid curve is above the dashed. The bottom left panel shows the discrete aperture smoothing function for a 6 element linear equidistant array when the array length is 1.5 times the array depth (top curve), 2.4 times the array depth (middle curve), and 3.0 times the array depth (bottom curve). All three curves show the discrete aperture smoothing function at $\phi=22.5°$. At normal incidence $\phi=0°$ the discrete aperture smoothing function is constant at 0 dB for all frequencies (not shown). Note that output at non-vertical angles is attenuated relative to the output at vertical. Furthermore, note that the attenuation increases with frequency and with the aperture length. The top right panel shows the combined spectrum of the ghost response and the discrete aperture smoothing function for the 6 element linear array when the array length is zero, i.e. point aperture, in the top solid curve, 1.5 times the array depth (second solid curve), 2.4 times the array depth (third solid curve), and 3.0 times the array depth (bottom solid curve). All four solid curves show the combined spectrum at $\phi=22.5°$. Also shown is the combined spectrum for $\phi=0°$ (dashed curve). The bottom right panel shows the spectral difference in dB between the combined response at $\phi=22.5°$ and $\phi=0°$ for the 6 element linear array when the array length is zero i.e. point aperture (top curve), 1.5 times the array depth (second curve), 2.4 times the array depth (third curve), and 3.0 times the array depth (bottom curve), i.e. the differences between the solid curves and dashed curve in the top right panel. The vertical lines in the top right and bottom right panels indicate the chosen highest frequency of interest ($d/\lambda=0.46$). Note that the third from top curve exhibits the smallest power spectral difference within this bandwidth.

For arrays with elements at substantially the same depth, the source depth, d, is normally chosen such that the highest frequency of interest is smaller than the first notch frequency, i.e. $f_{max}<c/(2d)$. In this example $f_{max}$ is chosen to coincide with the −6 dB point of the vertical ghost response, i.e. wavelengths larger than about 2.17 times the depth ($d/\lambda<0.46$). As illustrated in the bottom right panel of FIG. 1, the attenuation by the discrete aperture smoothing function increases with increasing array length and with increasing frequency. Consequently, by configuring the source elements in a linear non-zero aperture, the angular variation of the aperture smoothing function partially offsets that of the ghost response. In this specific example the maximum power spectral difference is minimized when the array length equals 2.4 times the array depth (third from top curve in bottom right panel).

Figure 2:
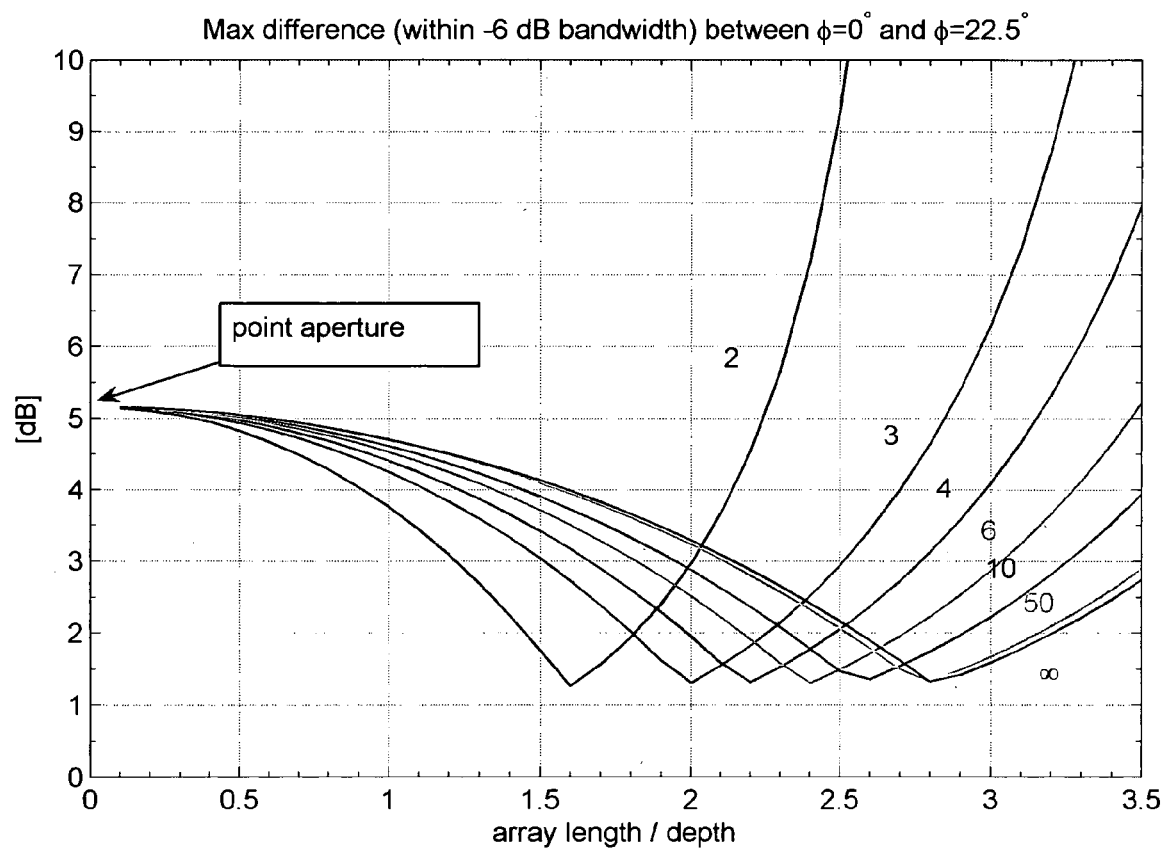
FIG. 2 shows the maximum difference of the combined response between 22.5 degree take-off angle and 0 degree take-off angle as a function of the array length-to-depth ratio of a single depth linear array with N=2, 3, 4, . . . elements.

The optimum array length-to-depth ratio also depends on the number of elements in the linear aperture. This is illustrated in FIG. 2, which shows the maximum difference (in dB) between the combined spectra at the same take-off angles ($\phi=0°$ and $\phi=22.5°$ and within the same bandwidth (−6 dB points of the vertical ghost response) as a function of the array length-to-depth ratio of a single depth linear array with N=2, 3, 4, . . . elements. As shown in FIG. 2, the optimum length-to-depth ratio is 1.6 for a 2-element aperture, 2.0 for a 3-element aperture, and 2.8 for a continuous aperture. Note, these optimum numbers will be different for other take-off angles and/or other bandwidths. Thus, it can be seen that the optimum length to depth ratio is between approximately 1.5 and 3, depending on the number of elements in the array.

Single Depth Planar Arrays

So far only examples of minimizing the spectral variation with take-off angle have been discussed. In an embodiment of the present invention, the variation with azimuth angle may also be minimized when designing optimum isotropic sources. This may be achieved by applying rotational symmetry (in azimuth) to the optimum linear arrays discussed in the previous section.

An example of such an array, which has six-fold azimuthal symmetry, is discussed in J. Hopperstad, J. Synnevaag, and P. Vermeer, 2001, "An azimuth-invariant source array": 71st Annual International Meeting, SEG, Expanded Abstract, 52-55, incorporated herein by reference in its entirety for all purposes. This array configuration is reproduced in FIG. 3 and consists of a circle with two-gun clusters and a three-gun cluster in the centre. The volumes are printed next to the airgun positions. In accordance with an embodiment on the present invention, by applying the principles discussed herein for single depth linear arrays, the optimum depth for this array may be derived with respect to minimizing the spectral variation with take-off angle: This array has a linear aperture of 3 elements with a total length of 12 metres. Assuming the same take-off angles and bandwidth of interest as shown in FIG. 2, the optimum length-to-depth ratio for this array is 2.0, i.e. the optimum depth is 6 metres.

Vertical Line Arrays

For vertical line arrays, equation 1 may be reduced to $$W(\omega, \phi) = \sum_{n=1}^{N} S_n(\omega) \cdot \left[\exp\left(\frac{j\omega d_n}{c}\cos\phi\right) - \rho\exp\left(-\frac{j\omega d_n}{c}\cos\phi\right)\right] \cdot \quad (5)$$

$$\exp(-j\omega\tau_n) \cdot \exp\left(\frac{-j\omega z_{ref}}{c}\cos\phi\right)$$

As with the single depth source discussed earlier, the best isotropic vertical line array may be derived by investigating the associated ghost response when the notional sources are substantially identical. In this case, the notional source spectrum is merely a spectral weighting function to the multi-depth ghost response.

Figure 4:
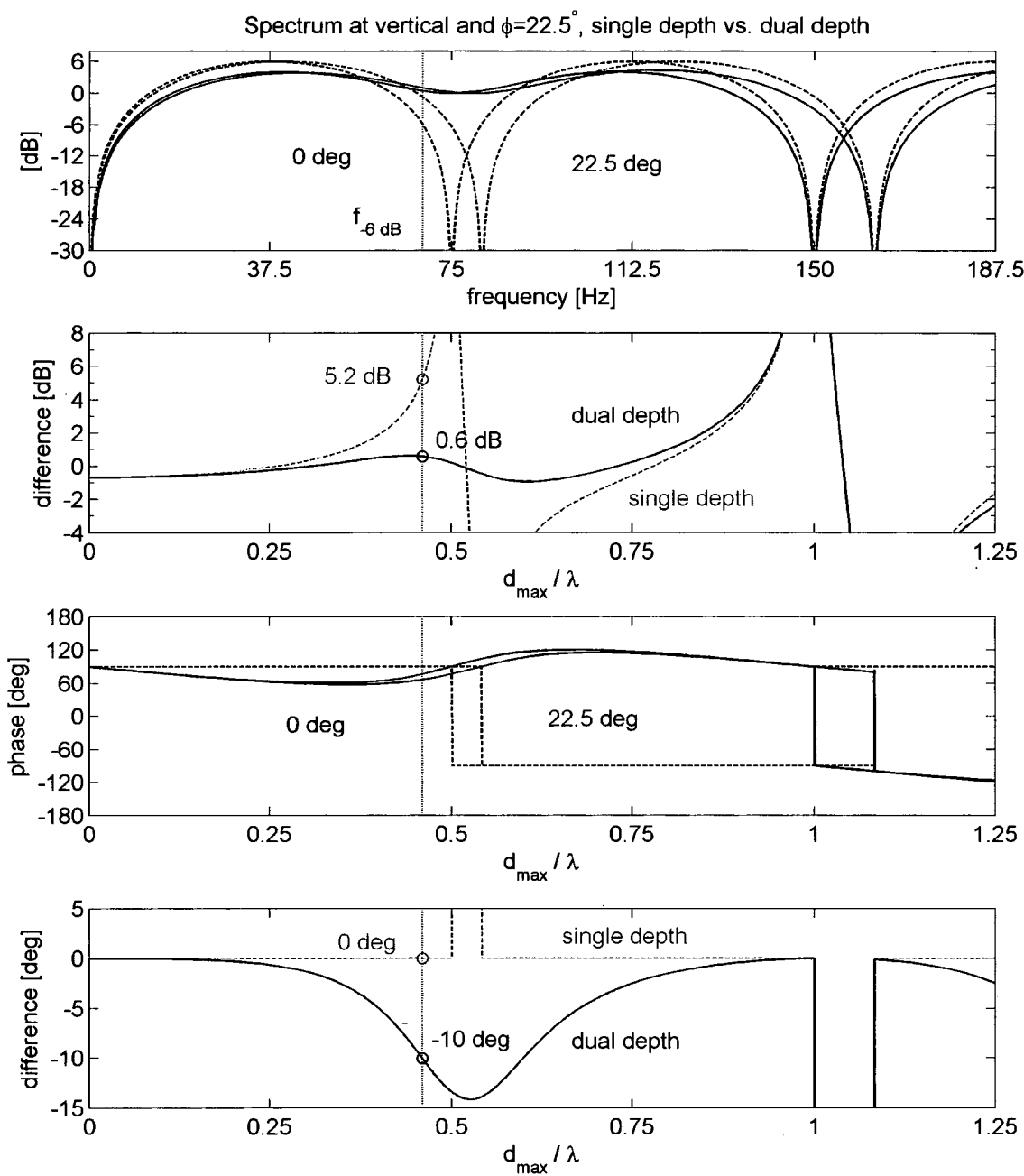
FIG. 4 compares the isotropic properties of a single depth source with a dual depth source.

The next example, FIG. 4, compares the isotropic properties of a single depth source with a dual depth source. The upper panel of FIG. 4 shows the ghost response of a point aperture (dashed curves) and a dual depth source (solid curves) at $\phi=0°$ and $\phi=22.5°$. The second panel shows the differences (in dB) between the spectra at 0° and 22.5° for the single depth source (dashed curve) and the dual depth source (solid curve). The third panel shows the phase spectra for the curves of the first panel. The chosen vertical reference position is at the sea surface for both the single depth source and the dual depth source. Staggered firing has been applied to the dual depth source to align the vertically down-going wavefields. The fourth panel shows the differences between phase spectra (in degrees at 0 degree and 22.5 degree take-off angles. The vertical line in all four panels indicates the chosen highest frequency of interest ($d_{max}/\lambda=0.46$).

As illustrated in FIG. 4, the variation in spectral power with take-off angle can be greatly reduced by filling the notch associated with the deepest element. In other words, by selecting the source depths, such that the first ghost notch occurs at a frequency significantly higher than the chosen frequency band, the power spectral difference with take-off angle is reduced by avoiding the steep roll-off near the notch frequency. As shown in the second panel in FIG. 4, the dual depth source has extended the upper limit of the frequency band, wherein the power spectral difference is small, from about $d_{max}/\lambda<0.80$ to about $d_{max}/\lambda<0.35$. Furthermore, by optimizing the depth selection, the multi-depth source can reduce the power spectral difference down to the level associated with the zero-frequency notch. This minimum level is given by $$\lim_{\omega \to 0} \log \frac{|W(\omega, \phi)|}{|W(\omega, \phi = 0)|} = \log|\cos\phi| \quad (6)$$

Figure 5:
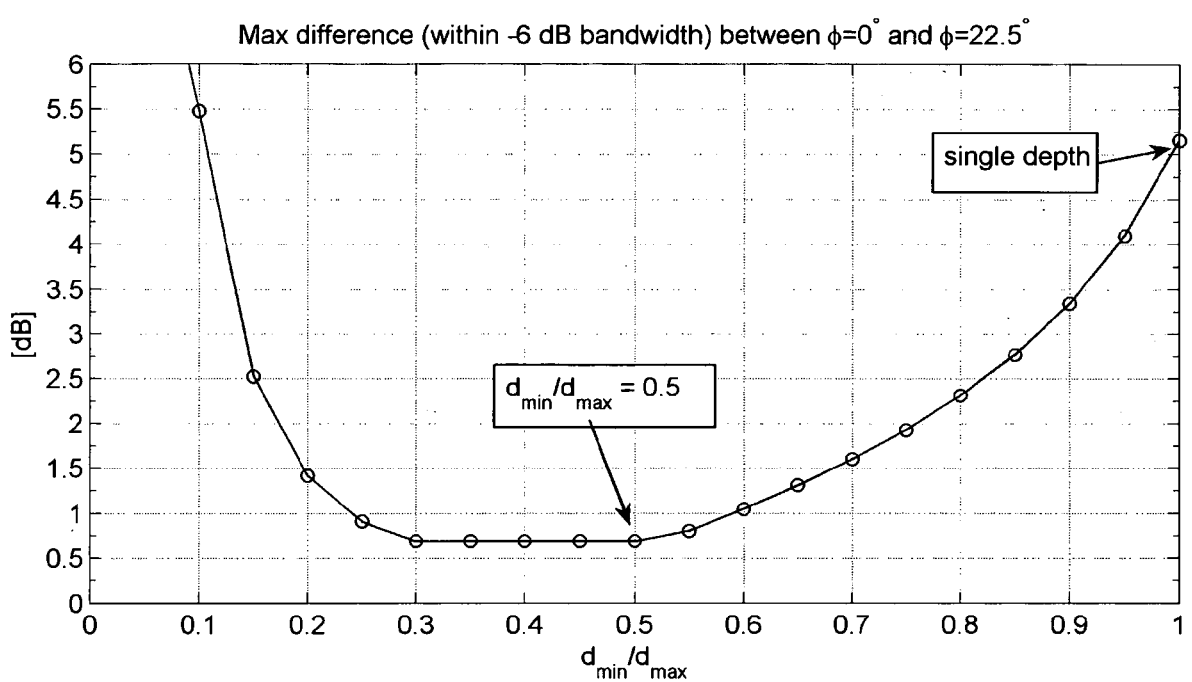
FIG. 5 shows the difference (in dB) of the dual depth ghost response between the vertical take-off direction and 22.5 degree take-off angle as a function of the depth ratio of the dual sources.

FIG. 5 shows the difference (in dB) of the dual depth ghost response between the vertical take-off direction and 22.5 degree take-off angle as a function of the depth ratio of the dual sources. FIG. 5 shows that in certain aspects this minimum level may be achieved for the dual depth source when the depth ratio is between 0.3 and 0.5 (at 22.5 deg take-off angle when the bandwidth of interest is given by the −6 dB points of the vertical ghost response of the deepest element). The minimum level is given by 20·log10(cos(22.5°))=0.69 dB.

Multi-Depth Arrays

In an earlier example, it was demonstrated that single depth planar arrays need to tailor the aperture smoothing function to the ghost response in order to minimize the spectral variation with take-off angle. However, single depth arrays are sensitive to geometry perturbations, such as changes to the length-to-depth ratio of the array.

Figure 6:
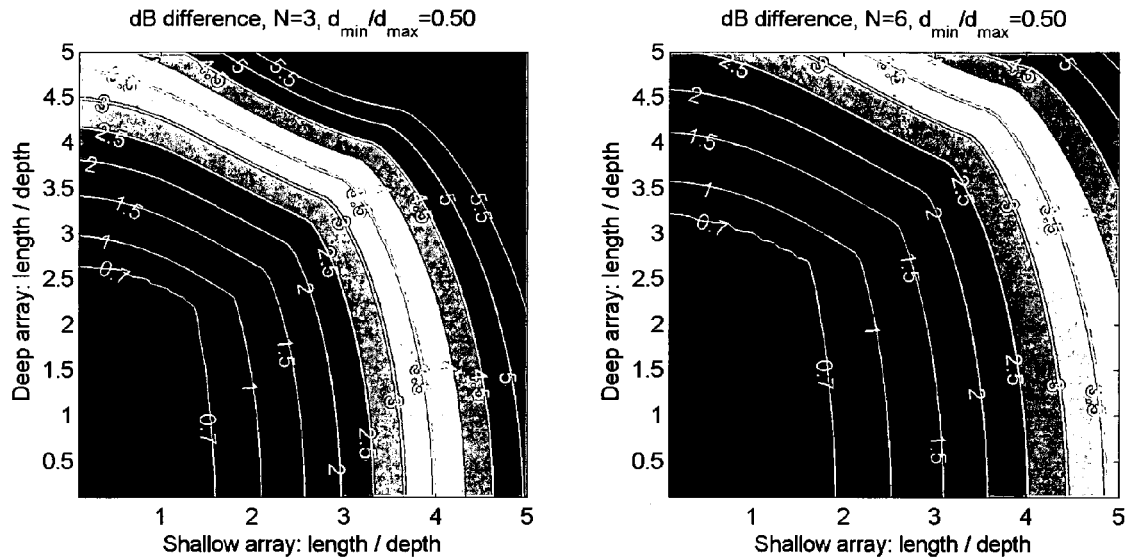
FIG. 6 shows the maximum difference (in dB) between dual depth array spectra (combined ghost response and aperture smoothing function) at 22.5 deg take-off angle and at normal incidence (0 deg) as a function of the array width-to-depth ratio of an array with a linear aperture with 3 elements (left panel) and 6 elements (right panel)
Figure 7:
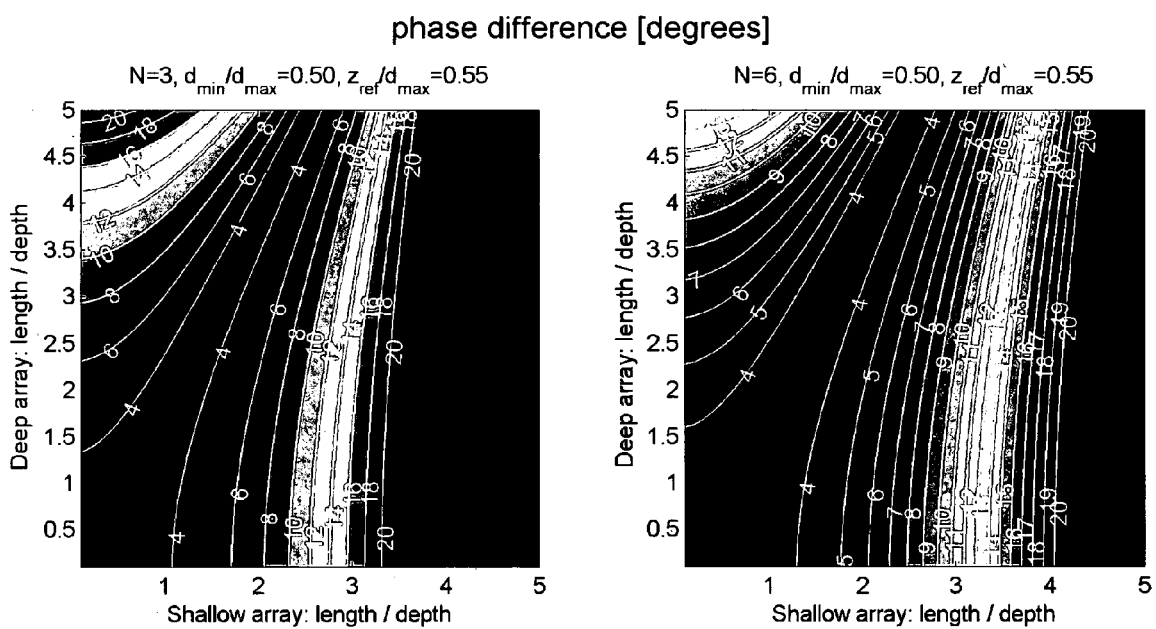
FIG. 7 shows the maximum phase difference (in degrees) for the same case as in FIG. 6.
Figure 8:
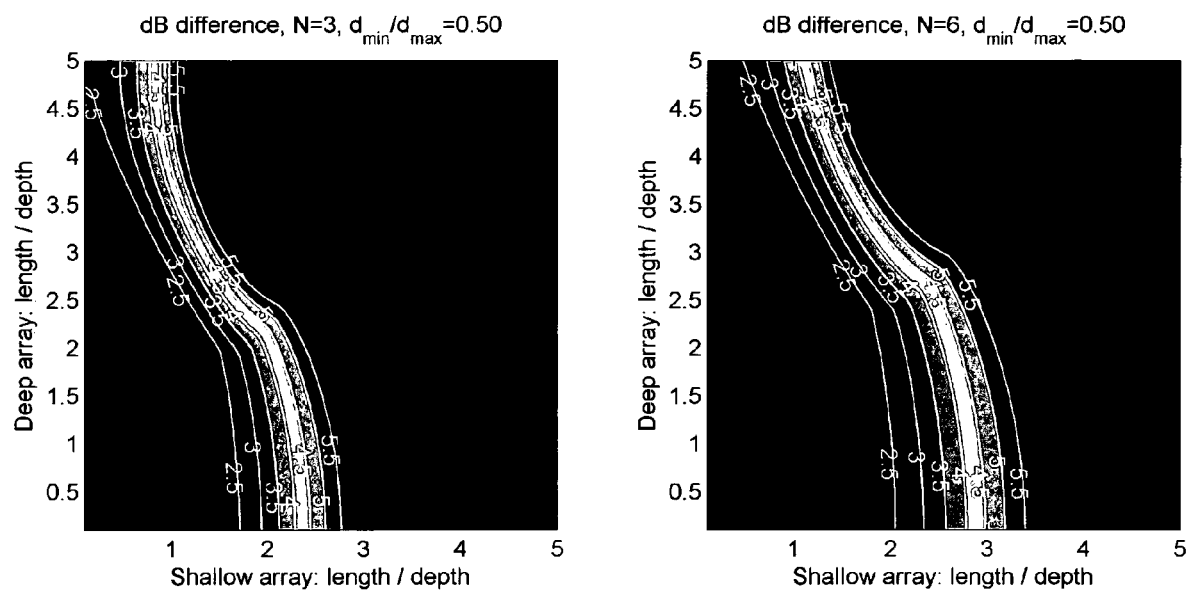
FIG. 8 shows the maximum difference (in dB) between dual depth array spectra (combined ghost response and aperture smoothing function) at 40 deg take-off angle and at normal incidence (0 deg) as a function of the array width-to-depth ratio of an array with a linear aperture with 3 elements (left panel) and 6 elements (right panel)

With multi-depth arrays the optimized array configuration can be made practically insensitive to the horizontal array dimension. This may be achieved by combining the source depths such that the first notch in the multi-depth ghost response is far beyond the highest frequency of interest. FIGS. 6 to 8 show examples of for what maximum horizontal dimension of the arrays, because of the associated aperture smoothing function, starts affecting the maximum difference of the farfield spectra. In all examples, the bandwidth of interest is given by the −6 dB points of the vertical ghost response of the deepest element. Furthermore, in all examples the depth ratio, $d_{min}/d_{max}$, is 0.5. FIG. 6 shows the power spectral difference between vertical and 22.5 degrees take-off angle, and FIG. 8 shows the difference between vertical and 40 degrees take-off angle. The left panel of FIG. 6 and FIG. 8 shows the case with three elements in the linear aperture, while the right panels show the six element case.

The darkest contours (<2 dB) in FIG. 6 and FIG. 8 show the level corresponding to the power spectral difference associated with the zero-frequency notch. This absolute minimum level is achieved when the length-to-depth ratio is less than about two, i.e. when the total array configuration fits within a ±45° cone from the sea surface.

In one embodiment of the present invention, by combining the concept of the azimuth invariant source array as provided in J. Hopperstad, J. Synnevaag, and P. Vermeer, 2001, "An azimuth-invariant source array": 71st Annual International Meeting, SEG, Expanded Abstract, 52-55 with the take-off angle invariant configurations discussed herein, the best isotropic source arrays may be configured, i.e. arrays with minimum variation in both azimuth and take-off angle; e.g. deploying two of the source array shown in FIG. 3, so that the depth ratio of the two layers is between 0.3 and 0.5, and so that the maximum lateral dimension-to-depth ratio is less than two. The resulting farfield spectrum will have optimum isotropy for take-off angles up to 22.5° and frequencies below the −6 dB points of the vertical ghost response of the deepest element.

The present invention provides a method for determining optimum parameters for source arrays that offsets the angular variation of the ghost response with the aperture smoothing function and the notional source spectra. It has been shown that the isotropy of single depth planar arrays is limited by how well the lateral geometry can be tailored to the angular variation of the high-frequency ghost notch, while multi-depth arrays can be designed to be insensitive to the lateral dimension. Optimum isotropic multi-depth sources are limited by the difference in power spectra in the region of the zero-frequency notch rather than the high frequency notch. This results in a smaller variation with take-off angle than of the single depth arrays.

Finding the Acoustic Centre of a Multi-Depth Array

The above analysis relates to achieving improved isotropy of the power spectrum of the source array. However, the phase spectrum of the source array also varies with azimuth and take-off angle. In the following examples we demonstrate that the phase variation with take-off angle strongly depends on the point that is considered the origin of the wavefield. This origin is often referred to as the acoustic center of the array. The acoustic center is the point from which the signal appears to have radiated. The center might be different for different frequencies; the one that minimizes the phase error across the whole bandwidth is termed the "phase center". The phase center of a single depth array is at the sea surface, because of the symmetry of the direct arrival of the "real array" and the sea surface reflection of the "ghost array". For multi-depth arrays, the optimum location of the center is complicated, because of the firing time delay that is applied to the deeper elements in order to align the vertically propagating wavefields. The staggered firing introduces significant phase variations with take-off angle. This is illustrated in the bottom panel of FIG. 4, which shows that aligning the vertical down-going wavefield results in a phase shift of up to ten degrees (between 22.5° take-off angle and the vertical direction). In the examples discussed in this document, it is found that the optimum location (i.e., the phase center) varies from the depth of deepest source layer to about the same depth as the shallowest layer, depending on the ratio of the depths.

The farfield spectrum of general multi-depth geometries is given by equation (1) above, wherein $\tau_n$ is the synchronization delays; e.g., setting $\tau_n=(z_n-z_{min})/c$ aligns the vertically downgoing wavefield, where c is the acoustic velocity. Note, the last factor shifts the reference point from the origin at the sea surface to a chosen vertical reference position $z_{ref}$, from which the traveltimes are computed. The optimum choice of reference position is termed the "phase center". We discuss the optimum choice for $z_{ref}$, i.e., the vertical position of phase center, such that the phase variation with take-off angle is minimized.

In the special case of identical planar source arrays that are vertically distributed, and where the triggering of the elements are staggered to align the vertically propagating wavefields, e.g., two identical layers deployed in an over/under configuration, Equation 1 can be expressed as:

$$W = \sum_{i=1}^{L}\left(\begin{array}{c}\left(\exp\left(\frac{j\omega d_I}{c}\cos\phi\right)+\rho\exp\left(\frac{-j\omega d_I}{c}\cos\phi\right)\right)\cdot \\ \exp\left(-j\omega\frac{d_I-d_{min}}{c}\right)\end{array}\right)\cdot\exp \quad (7)$$

$$\left(\frac{-j\omega z_{ref}}{c}\cos\phi\right)\cdot\sum_{m=1}^{M}S_m(\omega)\cdot\exp(jk_xx_m+jk_yy_m)$$

where d is the depth of each layer, $\phi$ is the take-off angle, and M is the number of elements in each of the L depth layers. Equation (7) shows that the farfield spectrum is, in this case, simply the product of the multi-depth ghost response (including the phase delay for the staggered triggering), the shift factor for the chosen vertical reference position $z_{ref}$, and the farfield spectrum of the identical depth layers. Similarly, note that the farfield phase spectrum of the array is the sum of the individual phase spectra of these three factors. Consequently, source arrays with isotropic phase spectra can be synthesized by analyzing the relative contribution of the phase spectra of the multi-depth ghost response, the vertical shift factor, and the identical depth layers. In particular, the following section discusses the optimum choice for $z_{ref}$, i.e., the vertical position of phase center.

Above it is demonstrated that the angular variation of the source power spectrum can be significantly reduced by using a second depth layer. It can also be showed that there is no advantage in using more than two layers (for reducing the angular variation). An example of the dual depth improvement is shown in the top two panels of FIG. 4, which compare the ghost response of a single depth and that of a dual depth source. The power spectrum of this dual depth source has optimum isotropy, because the take-off angle variation is limited by the difference near the zero-frequency notch. In contrast, the power spectrum of the single depth source is limited by the difference in the region close to the high-frequency notch.

Symmetric single depth arrays are better than any multi-depth depth arrays in terms of isotropy of the phase spectrum (but not the power spectrum or the pulse shape). The bottom panel of FIG. 4 shows an example of this, where the vertical reference, $z_{ref}$, is located at the sea surface. The difference between the single depth phase spectra (dashed lines) at 22.5° and 0° take-off angle is zero up to the frequency of the first ghost notch. While for the corresponding dual depth case, the staggered triggering results in a phase difference of up to 10° within the specified bandwidth.

Figure 9:
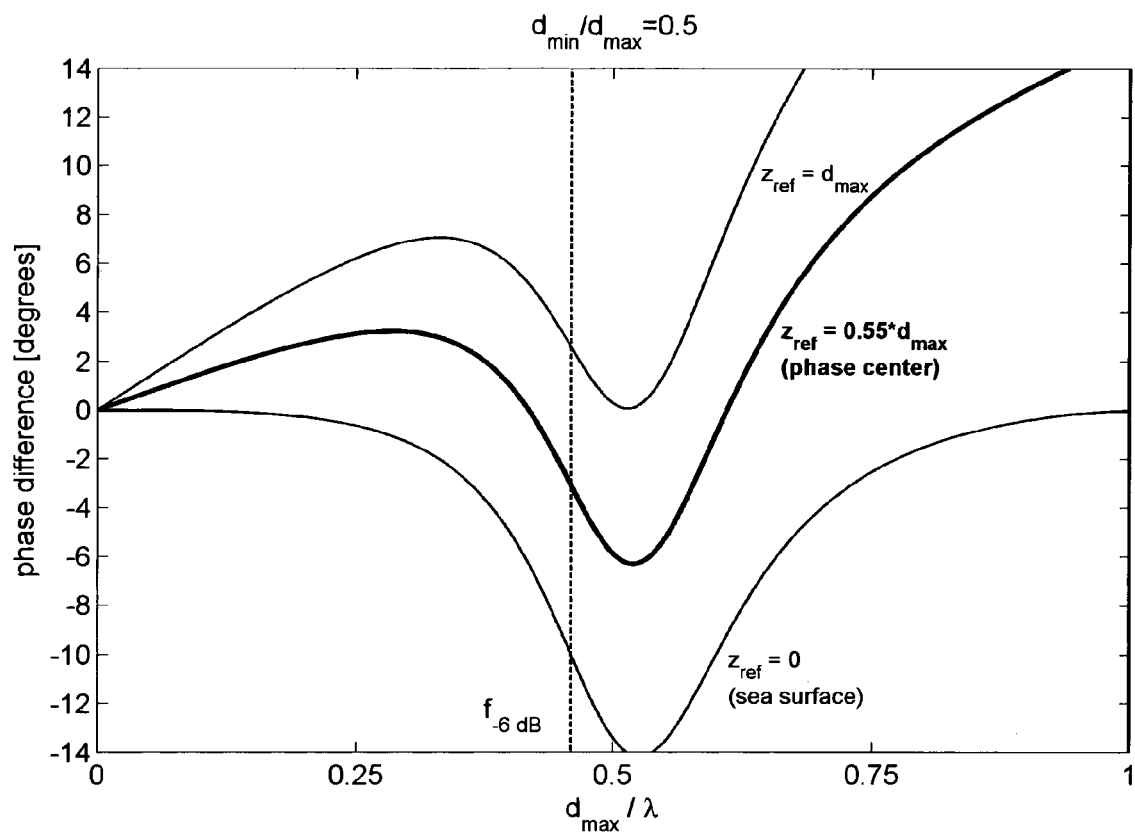
FIG. 9 shows the difference between dual depth ghost response phase spectra at 0 degrees and 20 degrees when the reference point is moved from the sea surface to the deepest layer.

The phase difference with take-off angle can be reduced by optimizing the location of the chosen vertical reference. FIG. 9 shows how the phase difference of the bottom panel of FIG. 4 ($d_{min}/d_{max}$=0.5) is reduced by relocating the vertical reference from the sea surface (lowest curve) towards the largest source depth (top curve). The maximum phase difference, within the specified bandwidth, is minimized when $z_{ref}\approx$ 0.55·$d_{max}$, (second curve from top), i.e., the phase center is located slightly deeper than the shallowest source depth. In this example, the maximum phase error is reduced from 10° to 3.2°. Alternatively, one can, in theory, completely correct for this phase difference in data processing by using a different phase center for each frequency. In these examples we only discuss using one phase center for the entire bandwidth.

In the analysis above, it is shown that, within this bandwidth and between these take-off angles, the isotropy of the dual depth source power spectrum is optimized when the depth ratio, $d_{min}/d_{max}$, is between 0.3 and 0.5.

Figure 10:
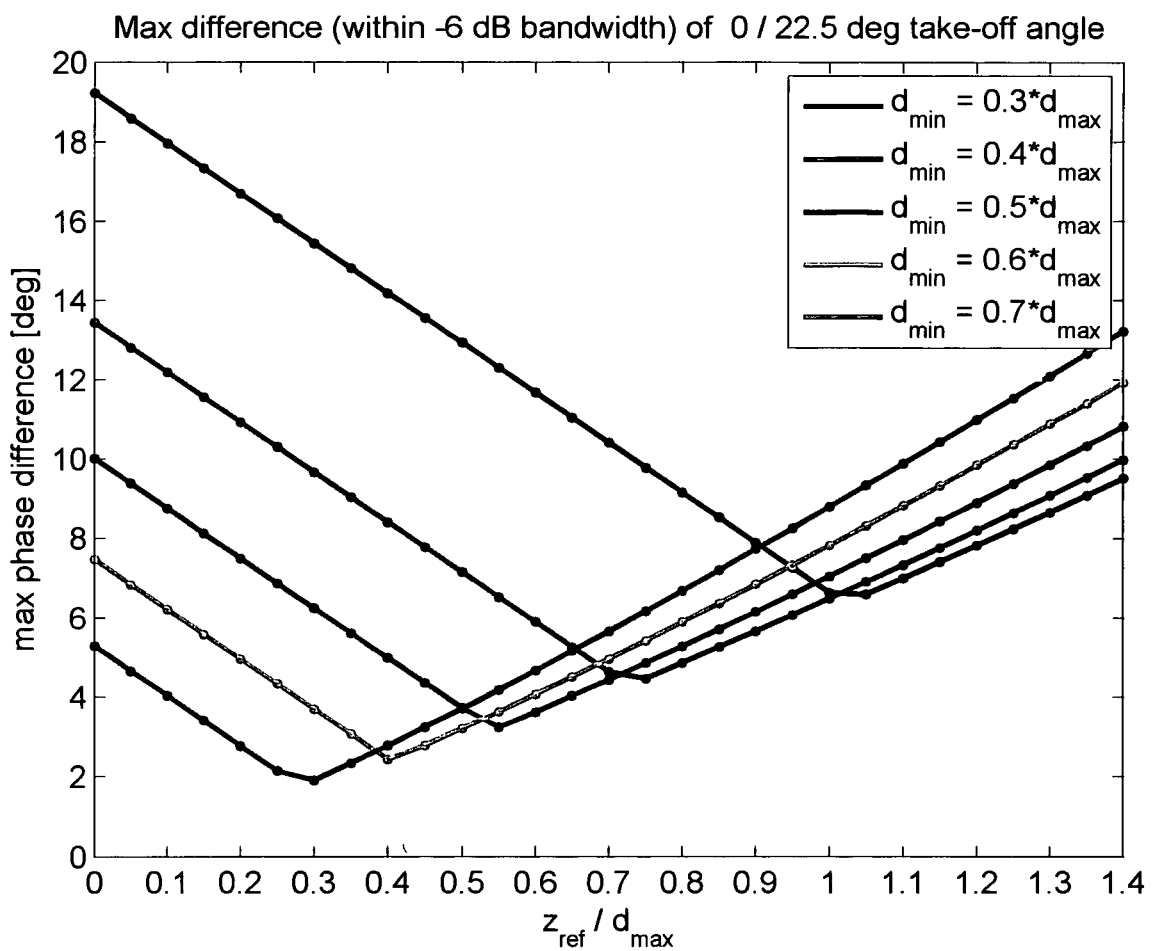
FIG. 10 shows the maximum phase difference between the dual depth ghost response in the vertical direction and 22.5 degree take-off angle as a function of the location of the phase center.

The optimum location of the vertical reference, i.e., the phase center, within this range of depth ratios is illustrated in FIG. 10 (between 22.5° take-off angle and vertical when the bandwidth of interest is given by the −6 dB points of the vertical ghost response of the deepest element). For a depth ratio of 0.3, the phase difference between 22.5° take-off angle and vertical is minimized when the reference point is located slightly deeper than the largest source depth ($z_{ref}$=1.05 $d_{max}$). For a depth ratio of 0.4, $z_{ref}$=0.75 $d_{max}$. For the example in FIG. 4 and FIG. 9 ($d_{min}/d_{max}$=0.5), the maximum phase difference is reduced from 10.0 to 3.2 degrees when the reference point is shifted from the sea surface to 0.55 times the depth of the deepest element.

Furthermore, FIG. 10 shows that the phase center, i.e., the optimum $z_{ref}$, moves towards the sea surface ($z_{ref}/d_{max}$=0) as the vertical distance between the two source layers decreases. A smaller linear phase shift is required to compensate for the angular variation caused by the vertical alignment of the wavefields (the staggered triggering). The phase center of a single depth array is at the sea surface, as previously discussed.

The extent of these optimized results are illustrated in FIGS. 6 and 7, which show the effect of the array length in an over/under source configuration, where each layer comprises a three or six element linear aperture. In FIG. 7, the phase centre has been shifted to its optimum location for these take-off angles and this bandwidth, i.e. 0.55 times the depth of the deepest element. FIG. 6 shows the difference between the power spectra, and FIG. 7 shows the difference between the phase spectra. Above, it is shown that the effect of the lateral geometry, on the power spectra, is insignificant when the length is less than about two times the depth. This region also coincides with the small contours of the phase difference, although the phase difference is minimized when the array lengths are equal. Note, the maximum phase variation is dominated by the staggered firing, rather than the different aperture smoothing functions, when the array length-to-depth ratio is less than about 1 (the 4° phase contour).

Figure 3:
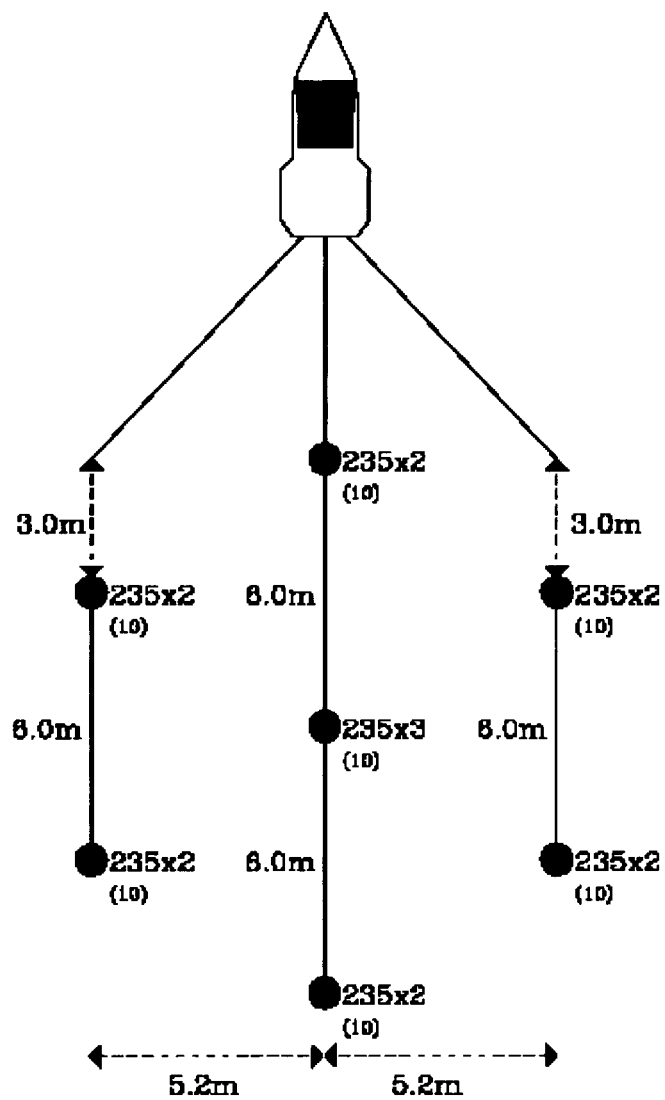
FIG. 3 shows an azimuth-invariant source array.

The variation with azimuth angle must also be minimized when designing optimum isotropic sources. This can be achieved by applying rotational symmetry (in azimuth) to the optimum linear arrays discussed in the previous example. An example of such a configuration, which has six-fold azimuthal symmetry, is the source array by Hopperstad et al. (2001) where two such hexagonal arrays are deployed in an over/under configuration, where one such depth layer is shown in FIG. 3. The resulting source will have a directivity pattern that is invariant in azimuth and minimized variation in take-off angle.

We have shown that the acoustic center of a single depth array is at the sea surface when the surface reflection is considered to be part of the source signature. This is the position that minimizes the phase difference with take-off angle, hence the term "phase center". Furthermore, we have shown that by careful choice of array element positions and firing delays, a source can be designed whose signature varies very little with take-off angle or azimuth. However, this multi-depth isotropic source has a phase center that is not located at the surface. In the examples discussed here, the phase center is located somewhere between the shallowest and deepest elements at a position that depends on the details of the array and the desired bandwidth. The position of the phase center must be included in the processing of the seismic image.

Figure 11:
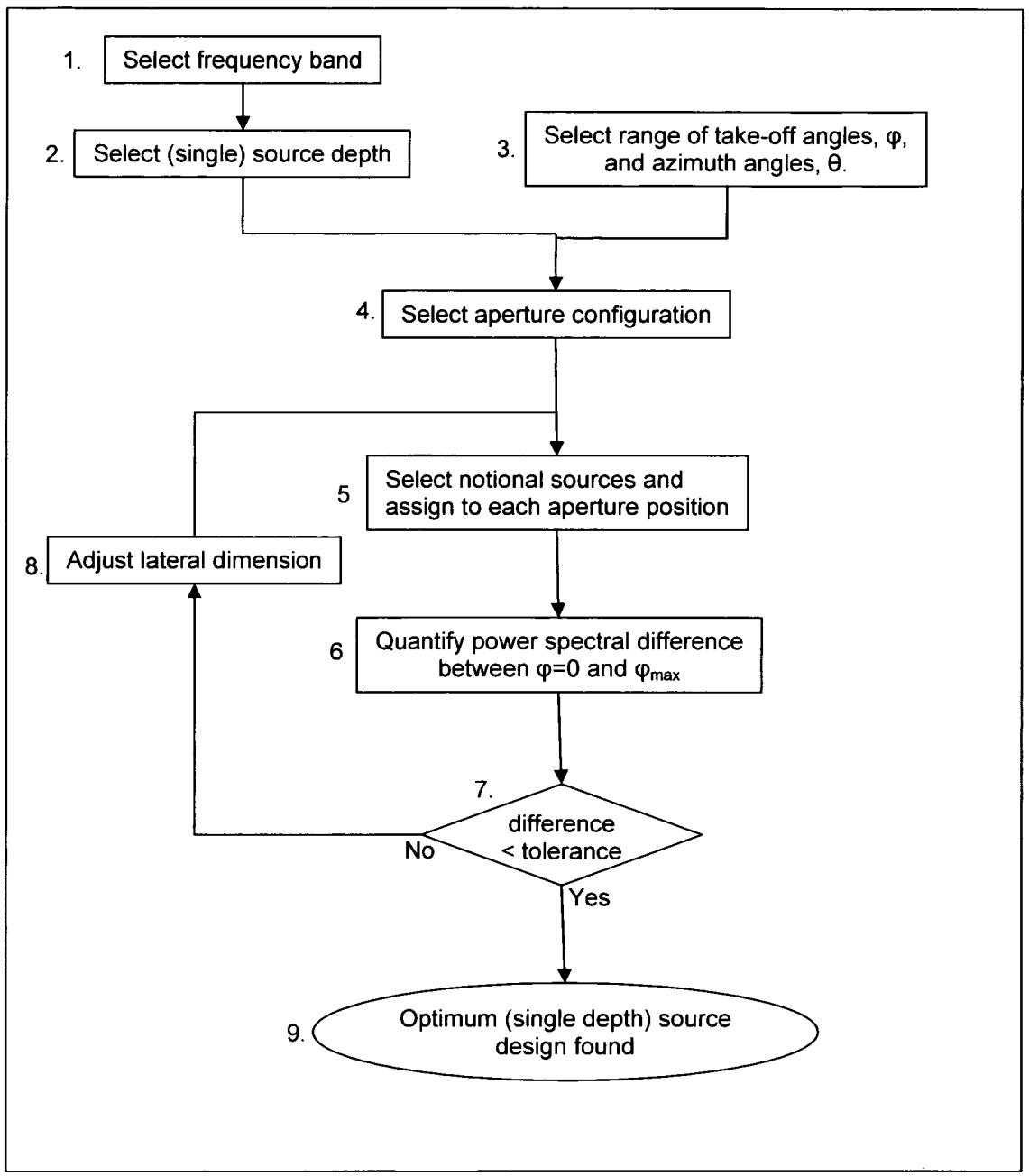
FIG. 11 is a flow chart illustrating a method of selecting optimum parameters of a single depth array.

FIG. 11 shows an embodiment of the process of selecting the optimum parameters for a single depth array, such that the spectral variation is minimized between the maximum take-off angle of interest, $\phi_{max}$, and vertical ($\phi=0$) within the selected frequency band.

In step 1 of FIG. 11, in step 1 the frequency band of interest is selected. In step 2, the source depth is selected based on the maximum frequency of interest, e.g. such that the maximum frequency coincides with the −6 dB point of the vertical ghost response. In step 3, the range of take-off angels, $\phi$, of interest and the range of azimuth angles, $\theta$, of interest, e.g. $0° \leq \phi \leq 22.5°$ and $0° \leq \theta < 360$.

In step 4, the aperture function is calculated by selecting the number of elements in the array and the lateral (x,y) position of each element. The element positions should have a degree of rotational symmetry within the azimuth angles of interest.

In step 5, a set of notional sources is selected and assigned to the aperture positions. The notional sources can be chosen based on conventional source design criteria, such as minimum required output and spectral flatness of the vertical farfield spectrum. In addition, the notional sources should be assigned to element positions, so that substantially identical notional sources are symmetrically located around the center.

In step 6, the difference of the power spectrum given by equation 1 is calculated, ie. the maximum dB difference between the maximum and minimum take off angles, eg $\phi=22.5$ and vertical ($\phi=0$) at all azimuth angles.

In step 7, the result of step 6 is compared with a user-defined tolerance, e.g. that the maximum power spectral difference for a given azimuth angle is minimized, i.e. maximum difference symmetrically distributed within the frequency band of interest within the numerical accuracy.

If the result is not less than the user defined tolerance, then in step 8 the lateral dimensions are adjusted by adjusting the x,y-positions of the elements in the aperture function, e.g. scale the aperture by a constant factor, and then steps 5, 6 and 7 are repeated until the result of step 7 is within the tolerance, wherein the optimum dimensions have been found in step 9 (i.e. the optimum source design has been found).

Figure 12:
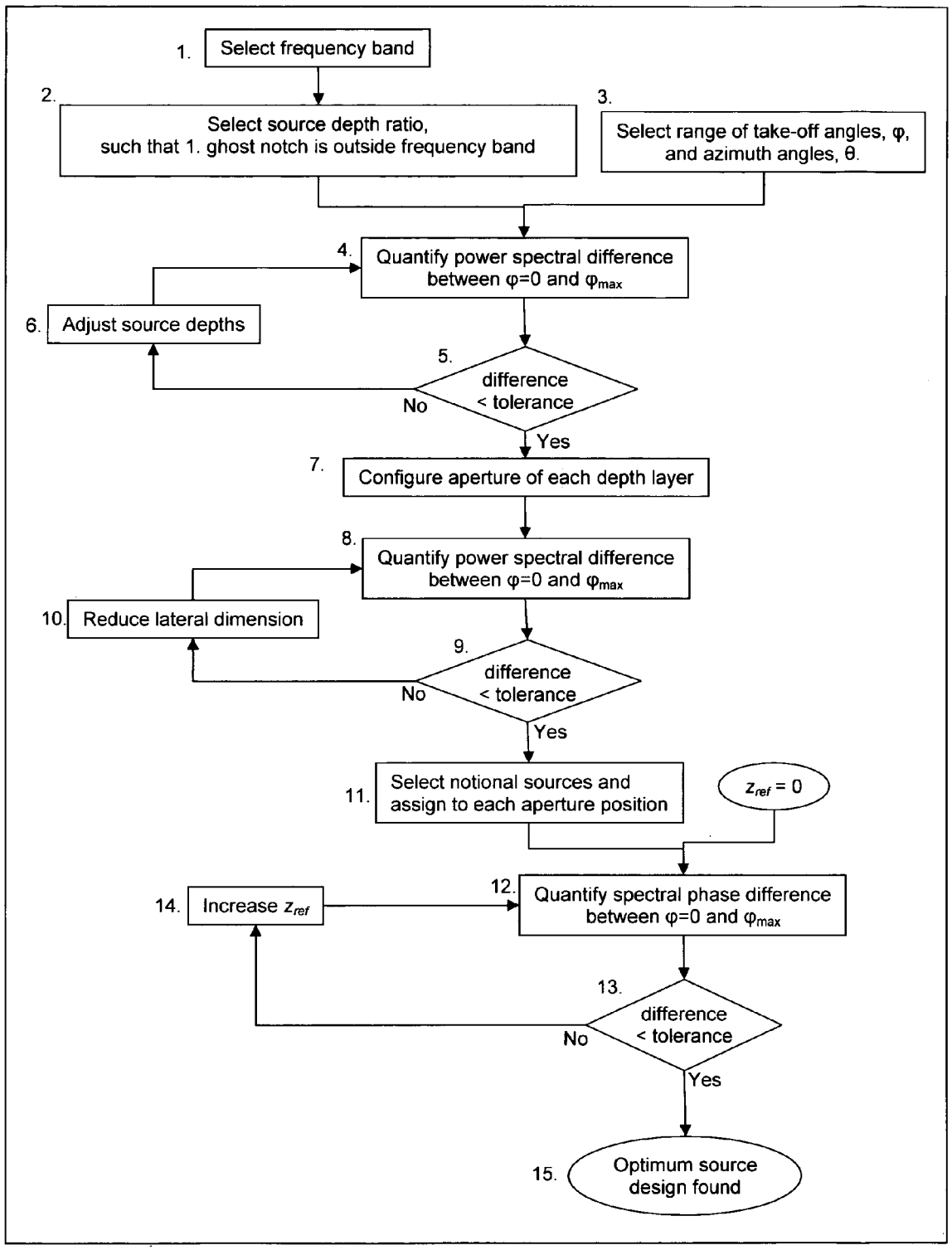
FIG. 12 is a flow chart illustrating a method of selecting optimum parameters of a multi depth array.

FIG. 12 shows an embodiment of the process of selecting the optimum parameters for a multi-depth array, such that the spectral variation is minimized between the maximum take-off angle of interest, $\phi_{max}$, and vertical ($\phi=0$) within the selected frequency band.

In step 1, the frequency band of interest is selected. In step 2, the source depths, and in particular the ratio of depths, are selected, such that the first notch frequency in the multi-depth ghost response is located outside the frequency band of interest, i.e., such that $f_{max} < c/(2 \cdot d_{min})$, e.g. so that $f_{max} \approx c/(2 \cdot d_{max})$.

In step 3, the range of take-off angels, $\phi$, of interest and the range of azimuth angles, $\theta$, of interest, e.g. $0° \leq \phi \leq 22.5°$ and $0° \leq \theta < 360°$ are selected.

In step 4, the difference of the power spectrum of the multi-depth ghost response is calculated, between the maximum take off angle of interest and vertical, e.g. the maximum dB difference between $\phi=22.5°$ and vertical $\phi=0°$ at all azimuth angles. In step 5, this difference is compared with a user-defined tolerance. If the difference is greater than the tolerance, at step 6 the source depths are adjusted and step 4 is repeated until a difference within the tolerance is achieved e.g. that the maximum power spectral difference for a given azimuth angle is minimized, i.e. maximum difference symmetrically distributed within the frequency band of interest within the numerical accuracy.

Once the optimum source depths have been selected, in step 7 the aperture function for each depth layer is selected, by selecting the number of elements at each depth layer and the lateral (x,y) position of each element. The element positions should have a degree of rotational symmetry within the azimuth angles of interest.

At step 8, the difference in power of the combined spectrum of the multi-depth ghost response and the aperture function between the maximum take-off angle off interest (e.g.) $\phi=22.5°$ and vertical ($\phi=0°$ at all azimuth angles is calculated, and at step 9 this is compared with a user-defined tolerance. If the difference is greater than the tolerance, the lateral dimensions of the array are adjusted at step 10 (e.g. by scaling the aperture by a constant factor), and step 8 is repeated until the difference is less than the tolerance. This means that the maximum power spectral difference for a given azimuth angle is minimized, i.e. maximum difference symmetrically distributed within the frequency band of interest within the numerical accuracy.

At step 11, a set of notional sources is selected and assigned to the aperture positions of each depth layer. The notional sources can be chosen based on conventional source design criteria, such as minimum required output and spectral flatness of the vertical farfield spectrum. In addition, the notional sources should be assigned to element positions, so that substantially identical notional sources are symmetrically distributed at each depth layer.

At step 12, the difference in phase of the total spectrum of the source is calculated, as described in equation 1, between the maximum take-off angle of interest (e.g. $\phi=22.5°$) and vertical ($\phi=0°$) at all azimuth angles. In the initial calculation use the sea-surface as the vertical reference, i.e. $z_{ref}=0$. At step 13, this is compared with user-defined tolerance, and if the difference is greater than the tolerance, $z_{ref}$ is increased in step 14, and step 12 repeated until a difference within the tolerance is achieved. Thus the maximum phase difference for a given azimuth angle is minimized, i.e. maximum difference symmetrically distributed within the frequency band of interest within the numerical accuracy.

At step 15, the optimum source parameters have been found, i.e. the optimum depths, optimum lateral positions, and optimum vertical reference position (i.e. the phase center).

While the principles of the disclosure have been described above in connection with specific apparatuses and methods, it is to be clearly understood that this description is made only by way of example and not as limitation on the scope of the invention. Further, a number of variations and modifications of the disclosed embodiments may also be used.

The invention claimed is:

1. A method for selecting parameters of a seismic source array comprising a plurality of source elements each having a notional source signature, the method comprising:
   calculating directivity effects of the seismic source array, wherein the directivity effects of the seismic source array are produced by the parameters of the seismic source array including positions of the plurality of source elements in the seismic source array, the notional source signatures of each of the plurality of source elements and firing times of each of the plurality of source elements;
   calculating directivity effects of a sea surface reflection of a source signal produced by the seismic source array; and
   adjusting the parameters of the seismic source array to provide that the directivity effects of the sea surface reflection are canceled or minimized by
   wherein the cancellation or minimization of the directivity effects of the sea surface reflection minimizes an angular variation of a far field response for the seismic source array in a predetermined frequency range.

2. The method of claim 1, wherein the array comprises a plurality of layers, each layer comprising a plurality of source elements having substantially a same depth.

3. The method of claim 2, wherein a depth ratio of the layers is adjusted such that a first notch in a ghost response is above the predetermined frequency band.

4. The method of claim 3, wherein the array comprises two layers of source elements and a depth ratio of the two layers is in the range 0.25 to 0.6.

5. The method of claim 4, wherein the array comprises two layers and a depth ratio of the two layers is in the range 0.3 to 0.5.

6. The method of claim 2, wherein a minimum wavelength of the predetermined frequency range is greater than 4/3 of a maximum source element depth.

7. The method of claim 2, wherein a minimum wavelength of the predetermined frequency band is greater than two times a maximum source element depth.

8. The method according to claim 2, wherein the notional source spectra of the elements at each depth layer are substantially identical.

9. The method of claims 2, wherein a length to depth ratio of each layer is less than 2.

10. The method of claim 2, further comprising:
    calculating a far field spectrum of the seismic source array having the selected parameters; and
    determining a phase centre of the seismic source array that minimizes angular phase variation of the far field spectrum in a predetermined frequency range.

11. The method of claim 1, wherein the seismic source array comprises a single layer of source elements at a common depth, and the selected parameters comprise a length to depth ratio of the seismic source array.

12. The method of claim 11, wherein the length to depth ratio is in the range 1.5 to 3.

13. The method of claim 1, wherein the source element positions substantially form a vertical line array.

14. The method of claim 1, wherein all of the notional source signals are substantially identical.

15. The method of claim 1, wherein the positions of the source elements have rotational symmetry in azimuth of order three or greater in the horizontal plane.

16. The method of claim 1, wherein angular variation of the source signal is minimized within a range of take-off angles of 0 to 40 degrees.

17. The method of claim 1, wherein the predetermined frequency range is 0 to 150 Hz.

* * * * *

UNITED STATES PATENT AND TRADEMARK OFFICE
CERTIFICATE OF CORRECTION

| | | |
|---|---|---|
| PATENT NO. | : 8,522,915 B2 | |
| APPLICATION NO. | : 12/809091 | |
| DATED | : September 3, 2013 | |
| INVENTOR(S) | : Jon-Fredrik Hopperstad et al. | |

It is certified that error appears in the above-identified patent and that said Letters Patent is hereby corrected as shown below:

On the Title Page, Item (60) should read

(60) Provisional application No. 61/015,115, filed on Dec. 19, 2007.

Signed and Sealed this
Twenty-fifth Day of March, 2014

Michelle K. Lee
*Deputy Director of the United States Patent and Trademark Office*